United States Patent [19]

Georgalas et al.

[11] Patent Number: 4,600,737

[45] Date of Patent: Jul. 15, 1986

[54] WATER DILUTABLE ACRYLATED EPOXY-PHENOLIC COATING COMPOSITIONS

[75] Inventors: Nick Georgalas, Brooklyn; John G. Pucknat, New York, both of N.Y.; Ralph R. Villano, Highland Lakes, N.J.

[73] Assignee: Inmont Corporation, Clifton, N.J.

[21] Appl. No.: 717,617

[22] Filed: Mar. 29, 1985

Related U.S. Application Data

[62] Division of Ser. No. 563,846, Dec. 21, 1983.

[51] Int. Cl.$^4$ .................. B65D 8/00; C09D 3/54; C09D 3/58; C09D 3/81
[52] U.S. Cl. .................... 523/414; 523/100; 523/424; 428/418; 428/35
[58] Field of Search .............. 523/100, 414, 424; 428/418, 35

[56] References Cited

U.S. PATENT DOCUMENTS

| | | | |
|---|---|---|---|
| 3,336,241 | 8/1967 | Shokal | 525/507 |
| 3,477,990 | 11/1969 | Dante et al. | 525/340 |
| 3,705,206 | 12/1972 | Broecker | 525/58 |
| 3,943,187 | 3/1976 | Wu | 428/418 |
| 3,997,694 | 12/1976 | Wu | 428/35 |
| 4,145,323 | 3/1979 | Sekmakas et al. | 523/100 |
| 4,212,781 | 7/1980 | Evans et al. | 525/63 |
| 4,289,674 | 9/1981 | Christenson et al. | 428/418 |
| 4,294,741 | 10/1981 | Bosso | 526/312 |
| 4,308,185 | 12/1981 | Evans et al. | 428/418 |
| 4,335,028 | 6/1982 | Ting et al. | 428/418 |
| 4,335,829 | 6/1982 | Christenson et al. | 220/458 |
| 4,341,678 | 7/1982 | Georgalas et al. | 523/414 |
| 4,444,923 | 4/1984 | McCarty | 523/100 |

*Primary Examiner*—Ronald W. Griffin
*Attorney, Agent, or Firm*—Harry J. Gwinnell; Emil Richard Skula

[57] ABSTRACT

A coating composition is produced particularly adapted for use on the interior of food containers, and specifically metal cans which contain proteinaceous foods. In addition to being nonstaining the particular coating composition is steam resistant and flexible. It is also water dilutable and storage stable. The polymer consists of a reaction product of a plurality of acrylic monomers in the presence of a high molecular weight epoxy resin, a phenolic resin, and a free radical initiator dissolved in a water miscible solvent. The solution is rendered water dilutable by the addition of aqueous amine which neutralizes the carboxyl functionality of the acrylic monomers.

6 Claims, No Drawings

WATER DILUTABLE ACRYLATED EPOXY-PHENOLIC COATING COMPOSITIONS

This is a division of application Ser. No. 563,846 filed on Dec. 21, 1983.

TECHNICAL FIELD

The field of art to which this invention pertains is water-containing polymer coating compositions, and specifically polymer coating compositions for the interior of food containers.

BACKGROUND ART

Polymer coating compositions designed for use on the interior of food containers are required to meet very stringent requirements. In addition to severe adhesion requirements to the substrate, the polymer must be able to withstand steaming, must not interact with the food material, and must not be subjected to staining from the food material. Added to these very rigorous requirements additional limitations on organic solvent content are being placed on polymer compositions in general.

Accordingly, what is needed in the art is a water dilutable coating composition which meets the above-recited stringent requirements and is specifically adapted to coating the interior of food containers.

DISCLOSURE OF INVENTION

The present invention is directed to a coating composition specifically adapted for use in the coating of the interior of food containers comprising the reaction product of a high molecular weight epoxy resin dissolved in an organic solvent, a phenolic resin dissolved in the same solvent, and a plurality of acrylic monomers, at least one of which is an acid monomer, polymerized by heating in the presence of the epoxy and phenolic resins dissolved in the organic solvent. The composition is rendered water dilutable by neutralizing the carboxyl functionality on the formed polymers with an aqueous amine. The resulting composition is storage stable, further water dilutable, and meets the stringent requirements of food container coatings in general. The resulting polymer composition is believed to be substantially an epoxy-phenolic copolymer having grafted thereon an acrylic copolymer, although variations and permutations based on the reactants are also considered to be present in the coating composition.

Another aspect of the invention includes a method of forming such a coating composition by dissolving the epoxy resin in a water miscible organic solvent, dissolving the phenolic polymer in the same solvent, adding the acrylic monomers to this solvent composition and reacting the composition in the presence of at least 3% of an organic peroxide (or free radical initiating equivalent) by heating (e.g. to a temperature below 120° C.). Any carboxyl functionality in the composition (stemming from the addition of acrylic monomers) is then neutralized with an aqueous amine solution.

Another aspect of the invention is a food container having at least the interior thereof coated with such composition.

Another aspect of the invention is a method of coating the interior of such food containers with such coating composition.

The foregoing and other objects, features and advantages of the present invention will become more apparent from the following description of preferred embodiments.

BEST MODE FOR CARRYING OUT THE INVENTION

Any high molecular weight epoxy resin can be used with the present invention as long as it has the requisite epoxy functionality.

A particularly suitable class of epoxy resins has the generalized formula:

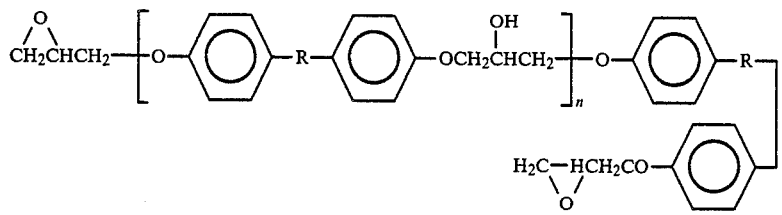

wherein R is an alkylene group of 1 to 4 carbon atoms and n is an integer from 1 to 12. The epoxy resins utilized with the present invention generally contain an average of two terminal 1,2-epoxy groups per molecule and are in the epoxy equivalent weight range of about 650 to about 5,000, and preferably about 1,000 to about 4,000. A preferred epoxy resin is EPON ® 1009 (Shell Chemical Corporation).

Other examples of suitable epoxy resins include glycidyl polyethers marketed under the trademarks of EPON Resin 1001, 1004, 1007, etc. Other suitable solid epoxy resins include the condensates or fusion resins prepared as described in U.S. Pat. No. 3,477,990. Under certain conditions, a portion of the epoxy resin can be glycidylized novolak. Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., (1) by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Epoxy resins that may also be used include the hydrogenated resins prepared by the process described in U.S. Pat. No. 3,336,241. More preferred are the hydrogenated glycidyl ethers of 2,2-bis (4-hydroxyphenyl) propane, sometimes called the diglycidyl ethers of 2,2-bis (4-cyclohexanol) propane.

Any phenolic resin may be used with the present invention as long as it has the requisite methylol functionality for reactivity. The preferred phenolic resins are the reaction products of phenol, substituted phenol, and bis-phenol A with formaldehyde under alkaline conditions. Under such conditions the methylol functionality is inserted either ortho- or para- in the aromatic ring. Rate studies have established that the para-position to the hydroxyl is slightly more reactive toward formaldehyde but, in the case of phenol or bis-phenol A which contains no other substituents, there are 2 ortho- positions available, and the ortho-methylol compound is formed at a faster overall rate. Essentially, a mixture of methylol phenols is formed, some of which have more methylol groups than others.

In the processing of phenol resin manufacture, the polymerization or dehydration stage is carried out under the original alkaline conditions or after neutralization of the methylol mixture. The resulting methylol-containing resin, called a resole resin, is a complex mixture of mono- and poly-nuclear molecules joined by methylene or dimethyleneoxy linkages. These polymer structures contain three methylene groups for subsequent reactivity, and are phenolic resins suitable for use with the present invention. These phenolic resins can react by the action of acid and/or heat with the carboxyl, oxirane and hydroxyl substituents present in the epoxy-acrylic resin according to the present invention. However, the methylol functionality of the phenolic resin remains essentially intact under the mild acrylation techniques practiced under this invention. It is essential that the methylol functionality remains intact or premature cross-linking and gelation will prevent further utility. In addition, preservation of the methylol functionality is needed for the development of coating properties during the curing cycle of the coating.

Another suitable phenolic resin useful with the present invention is formed by an alkylation procedure which results in ether formation with the methylol groups. Butanol is the preferred alkylating agent. Alkylation with butanol results in improved solubility and compatibility of the phenolic resin with the other components (epoxy and acrylic) of the present invention. However, alkylation of the methylol groups does not diminish coating reactivity. Both phenolic resins containing free methylol groups and phenolic resins containing alkylated methylol groups have been successfully used according to the present invention. It should be noted that phenolic resins above-described are known and commercially available.

The acrylic monomers which are useful according to the present invention include well-known acrylic monomers such as acrylic acid, lower alkyl substituted acrylic acids such as methyl, ethyl, butyl, propyl etc. acids (e.g. methacrylic). The lower alkyl esters of such acrylic acids are also useful such as methyl acrylate, butyl acrylate, methyl methacrylate, etc., corresponding to the above-recited acids (note U.S. Pat. No. 4,308,185 the disclosure of which is incorporated by reference). It should be recognized by those skilled in the art that COOH functionality may also be introduced by copolymerizing other non-acrylic monomers such as: maleic anhydride, itaconic acid, etc.

Any water miscible organic solvent which will dissolve both the epoxy and phenolic resins are useful with the present invention. Typical of such solvents are normal butyl alcohol, secondary butyl alcohol, alkyl ethers of ethylene and propylene glycols, for example, ethoxyethanol, propoxypropanol, 2-butoxy-ethanol, diethylene glycol mono-methyl, ethyl and butyl ethers, etc.

Initiators suitable for inducing the graft-copolymerization of the acrylic monomers onto the epoxy-phenolic resins are organic peroxides and their equivalents. Some preferred initiators are t-butyl peroctoate, t-butyl peroxyacetate, t-butyl perbenzoate, benzoyl peroxide, and 2,2'-azobis-(2-methylpropionitrile).

The present invention is based upon the discovery that when the epoxy and phenolic resins and addition polymerizable monomers are reacted together at elevated temperature (below the cure temperature of the composition which is typically about 200° C., and thus this heating is typically below about 120° C.) in the presence of at least 3% (preferably 3% to 8% by weight based on the weight of acrylic monomers present) organic peroxide or an equivalent free radical initiator, addition and grafting reactions proceed simultaneously. The grafting (apparently) takes place at the aliphatic groups present in the epoxy-phenolic resin backbone carbon chain. The reaction mixture that is obtained includes graft polymers, associatively-formed ungrafted addition polymers, and some unreacted epoxy-phenolic resin.

The key feature of the reaction to produce viable coatings according to the present invention is that the polymerization-grafting must be conducted in co-dissolved epoxy-phenolic resins. If the polymerization and grafting are conducted separately to form epoxy-acrylic and phenolic-acrylic graft copolymers and then combined, the combinations form unstable coatings. Moreover, upon curing, opaque films rather than clear films are obtained.

The grafting that occurs exerts a profound influence on the properties of the reaction mixture. Thus, when the addition of polymerizable monomer includes a major amount of an acrylic or methacrylic acid, both the graft polymers and the ungrafted addition polymers that are produced are carboxylic acid-functional and in the presence of an amine solubilizing agent, the reaction products may be readily dispersed in water to form a stable system. For satisfactory dispersion, the acid number of the reaction mixture should be sufficient for establishing and maintaining the polymer in aqueous dispersion (e.g. acids numbers of 35 to 86 are typical). Moreover, the carboxyl-functional addition and graft co-polymers which result from this reaction have adequate dispersing ability to maintain any ungrafted epoxy-phenolic resins as stable aqueous dispersions.

The ratio of epoxy to phenolic resins (the following ratios are all parts and percents by weight unless otherwise specified) are approximately equal with perhaps a slight excess of epoxy resin. For example, the epoxy should constitute about 40 to about 60 parts by weight with phenolic resin constituting about 30 to about 40 parts by weight. The acrylic monomers represent 25% to 35% of the total acrylic and epoxy-phenolic composition with about 30% being preferred. The preferred acrylic composition is constituted by about 20% to about 30% acrylic or methacrylic acid, about 30% to about 40% butyl acrylate, about 30% to about 40% methylmethacrylate, about 10% to about 20% hydroxyethylacrylate and about 20% to about 30% styrene.

As used, the mixture of water and organic solvents for coating application is typically about 70% to about 80% water and about 20% to about 30% organic solvent. For coating purposes the concentration of the epoxy-phenolic acrylic polymer composition according to the present invention is typically about 60% to about 70% by weight solids in organic solvent prior to dilution.

Amines useful to perform the last step in the reaction, the neutralization of the unreacted carboxyl groups are as follows: aqueous ammonia, and RNH$_2$ wherein R may be an alkyl radical, e.g. methyl, propyl, butyl and the like; or an alkanol radical, e.g. methanol, ethanol, propanol and the like. A preferred primary amine is 2-amino-2-methyl-1-propanol.

Suitable secondary amines include the amines of the general formula:

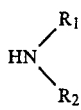

wherein R$_1$ and R$_2$ may be the same or different hydrocarbon radicals; such as alkyl radicals: methyl, propyl, butyl and the like; alkanol radicals: methanol, ethanol, propanol and the like.

Examples of very suitable secondary amines include N-methyl-ethanol amine, diethanolamine, dimethylamine, diethylamine, dipropylamine, and morpholine.

Suitable tertiary amines include the amines of the general formula:

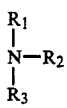

wherein R$_1$, R$_2$ and R$_3$ may be the same or different hydrocarbon radicals, such as alkyl radicals: methyl, propyl, isopropyl, butyl, etc.; alkanol radicals: methanol, ethanol, propanol, isopropanol, and the like.

Examples of preferred, tertiary amines include triethylamine, triisopropylamine, tributylamine, dimethylethanolamine and diethylethanolamine. Most preferred are the tertiary amines and particularly dimethylethanolamine. Amounts of amine added will be sufficient to neutralize from about 50% to 100% of the carboxyl groups present.

The method of application can be any conventionally used application method in this art such as spraying and roller coating. For beverage containers the preferred method is spraying. For food containers the preferred method is roller application. The coatings are generally applied in thicknesses up to about 3.5-4 mg./square inch.

The following examples demonstrate specific workups of the coating composition according to the present invention.

EXAMPLE 1

Epoxy resin, (EPON 1009) 162.0 parts, was added to a mixture of 135.0 parts of n-butanol and 135.0 parts of 2-butoxyethanol and the mixture was heated to 135° C. for solubilization. When the epoxy resin had dissolved, 216.0 parts of orthocresol-formaldehyde phenolic resin, (softening point 65°-75° C., hot plate cure at 150° C., 70-110 seconds) were added portionwise and the slurry was stirred for 30 minutes at 90° C. until completely solubilized. A mixture of 59.7 parts of acrylic acid, 51.3 parts of methyl methacrylate, 51.3 parts of butyl acrylate, 15.6 parts of n-butanol, 15.6 parts of 2-butoxyethanol, and 12.9 parts of tertiary butyl peroctoate was added over a two-hour period while the reaction temperature was maintained at 95°±3° C. After stirring for an additional two-hour period at 95°±3° C., a mixture of 55.5 parts of dimethylethanolamine and 808.8 parts of deionized water was added to give 1700 parts of product at 34.89% solids content, having a Brookfield viscosity (25° C.) of 114 poises and a pH of 7.3.

EXAMPLE 2

107.4 parts EPON 1009 was added to a mixture of 94.5 parts 2-butoxyethanol and 40.5 parts n-butanol, heated to 135° C. until epoxy resin was dissolved. The temperature was lowered to 95° C. and 143.2 parts of phenolic resin (see Example 1) was added and stirred until dissolved. At this point a mixture of 42.2 butyl acrylate, 31.5 parts methyl methacrylate, 10.7 parts hydroxy ethyl acrylate, 22.9 parts acrylic acid, 14.6 parts 2-butoxyethanol, 6.2 parts n-butanol and 8.6 parts tertiary butyl peroctoate was added over a two-hour period while the reaction temperature was maintained at 95°±3° C. After stirring an additional 2 hours at 95° C., a mixture of 21.5 parts dimethylethanolamine and 537.2 parts deionized water was added to give 1081.0 parts of product at 31.74% solids content having a Brookfield viscosity (25° C.) of 8.5 poises and a pH of 7.45.

EXAMPLE 3

143.2 parts EPON 1009 was added to a mixture of 94.5 parts 2-butoxyethanol and 40.5 parts n-butanol, heated to 135° C. until epoxy resin was dissolved. The temperature was lowered to 95° C. and 107.4 parts of phenolic resin (see Example 1) was added and stirred until dissolved. At this point a mixture of 42.2 parts methyl methacrylate, 42.2 parts butyl acrylate, 22.9 parts acrylic acid, 14.6 parts 2-butoxyethanol, 6.2 parts n-butanol and 8.6 parts tertiary butyl peroctoate was added over a two-hour period while the reaction temperature was maintained at 95°±3° C. After stirring an additional 2 hours at 95° C., a mixture of 21.5 parts dimethylethanolamine and 537.2 parts deionized water was added to give 1081.0 parts of product at 31.84% solids content having a Brookfield viscosity (25° C.) of 17.0 poises and a pH of 7.45.

EXAMPLE 4

To a solution of 54.0 parts of EPON 1009 resin in a mixture of 19.7 parts of n-butanol and 45.0 parts of 2-butoxyethanol at 90° C. was added 97.3 parts of bisphenol A-formaldehyde butylated phenolic resin at 74.0% solids content in n-butanol (72.0 parts of resin). A mixture of 19.9 parts of acrylic acid, 17.1 parts of methyl methacrylate, 17.1 parts of butyl acrylate, 4.3 parts of tertiary butyl peroctoate, 5.2 parts of n-butanol and 5.2 parts of 2-butoxyethanol was added to the slurry at a constant rate over a two-hour period while the reaction temperature was maintained at 96°±1° C. After stirring for an additional two-hour period at 96°±1° C., a mixture of 18.5 parts of dimethylethanolamine and 267.0 of product slurry at 33.9% solids content, having a parts of deionized water was added to give 573 parts Brookfield viscosity of 103 poises (25° C.) and a pH of 7.6.

EXAMPLE 5

143.2 parts EPON 1009 were added to 94.5 parts 2-butoxyethanol heated to 130° C. until the resin was dissolved. The temperature was lowered to 95° C. and 144.0 parts of butylated phenol-formaldehyde phenolic resin (74.6% solids at 2950 cps) and 10.1 parts n-butanol added with agitation until a homogeneous mixture is attained. At this point 38.0 parts 2-ethylhexylacrylate, 46.4 parts methyl methacrylate, 22.9 parts acrylic acid, 14.6 parts 2-butoxyethanol and 8.6 parts t-butyl peroctoate were added over a two-hour period while the reaction temperature was maintained at 95°±3° C. After stirring an additional 2 hours at 95° C., a mixture of 14.2 parts dimethylethanolamine and 350.0 parts deionized water were added to give 886.5 parts of product at 39.14% solids content having a Brookfield viscosity (25° C.) of 26.2 poises and pH of 7.10.

Coating compositions prepared according to the above examples were further reduced with deionized water to about 26% to about 32% solids, pH 7.0-8.2, and a viscosity Ford Cup No. 4, 60-100 seconds, water:co-solvent 82:18, parts and percents by weight. Coatings so reduced were direct roll coated on tin-free steel at film weights of 3.5-4.0 milligrams/square inch and cured at 400° F. for ten minutes. Cured coatings, as per the 400° F. cure cycle, were tough and chemically resistant. Applied and cured coatings passed coating performance tests described below.

The coated metal substrates were flexible, process resistant, solvent resistant, food resistant and shelf stable. For example, flexibility was measured by subjecting the coated metal panel to steam at 250° F. for 90 minutes, acid-copper sulphated to facilitate examination of the presence of microcracks and none were found. Process resistance was measured by placing the panels in partially water-filled pressure cookers and kept there for 90 minutes at 250° F. No blistering, loss of adhesion or blushing was found. Solvent resistance was measured by taking the coated panel and mechanically rubbing it 200 times with a cloth soaked in methyl-ethyl-ketone. No delamination, dissolution or penetration of solvent was found. Food resistance was measured by subjecting the coated panels fabricated into can ends for 90 minutes at 250° F., and for three weeks at 120° F. in contact with dog food and tomato puree. No staining or discoloration due to food-coating interaction was found. Furthermore, high temperature stability, i.e., shelf life, is a significant problem with the water-base compositions. Viscosity buildup through chemical reaction in the past could only be solved if a two-package system were used. Shelf (storage) stability of the present compositions was determined by heating the compositions for 1 to 3 weeks at 120° C. The compositions lasted for more than 1 week. Such compositions would last for months at room temperature.

Although this invention has been shown and described with respect to a preferred embodiment, it will be understood by those skilled in this art that various changes in form and detail thereof may be made without departing from the spirit and scope of the claimed invention.

We claim:

1. A water dilutable, storage stable coating composition comprising an organic solvent-containing aqueous solution of the reaction products of a high molecular weight epoxy resin, a phenolic resin, and a plurality of acrylic monomers at least one of which is an acid, said composition reacted in water miscible organic solvent and neutralized with aqueous amine, wherein the acrylic monomers are polymerized in the presence of the epoxy resin and phenolic resin such that the reaction product comprises graft copolymers.

2. The composition of claim 1 wherein the acrylic monomers are present in an amount of about 25% to about 35% by weight, the epoxy resin is present from about 40% to about 60% by weight, and the phenolic resin is present from about 30% to about 40% by weight.

3. The composition of claim 1 wherein the epoxy resin comprises a glycidyl polyether.

4. The composition of claim 1 wherein the phenolic resin contains a phenol, substituted phenol, or bis-phenol A.

5. A method of making a water dilutable, acrylated epoxy-phenolic coating composition comprising:
   dissolving a high molecular weight epoxy resin in a water miscible organic solvent;
   dissolving a phenolic resin in the epoxy resin - containing organic solvent;
   adding a plurality of acrylic monomers at least one of which is an acid to the epoxy-phenolic solvent solution;
   polymerizing the acrylic monomers in the epoxy-phenolic solvent solution by heating such that at least some of the monomers are grafted onto the epoxy resin and phenolic resin;
   neutralizing the carboxyl functionality of the acrylic monomers with an aqueous amine to form a stable, water dilutable coating composition.

6. A method of coating the interior of a food container comprising applying to the interior of the container an organic solvent - containing aqueous solution of the reaction product of a high molecular weight epoxy resin, a phenolic resin, and a plurality of acrylic monomers at least one of which is an acid wherein at least some of the monomers are grafted to the epoxy resin and the phenolic resin, and heating to cure the applied coating.

* * * * *